UNITED STATES PATENT OFFICE 2,399,126

ETHERIFICATION PROCESS

Arthur P. Lien, Hammond, Ind., assignor to Standard Oil Company, Chicago, Ill., a corporation of Indiana No Drawing. Application June 30, 1944,
Serial No. 543,059

12 Claims. (Cl. 260—614)

This invention relates to the manufacture of ethers and particularly to the manufacture of ethers from alcohols and olefins in the presence of an improved catalyst. One of the objects of the invention is to provide a catalyst for carrying out this reaction at lower temperatures and lower pressures than heretofore. Another object of the invention is to improve the yield and purity of the desired ethers and reduce the amount of accompanying by-products. Still another object of the invention is to provide a catalytic process of making ethers from olefins and alcohols wherein the catalyst is recycled in the process thereby reducing the amount of catalyst required.

It has heretofore been known that ethers and particularly the mixed ethers could be made by interacting alcohols with olefins in the presence of catalysts. As examples of such catalysts may be mentioned sulfuric acid, phosphoric acid, aluminum chloride, boron fluoride, hydrofluoric acid, etc. The use of these catalysts, however, has frequently required the use of very high pressures where gaseous olefins were employed and long reaction times, and has also resulted in the formation of undesirable by-products, particularly olefin polymers. I have now discovered that the formation of ethers by interaction of alcohols and olefins is greatly facilitated by the use of a compound catalyst, the principal ingredients of which are hydrofluoric acid and boron fluoride. The enhanced activity of this catalyst for promoting the etherification reaction involving alcohols and olefins is believed to be due to the formation of a complex compound between the HF and $BF_3$—possibly a compound such as $HBF_4$ or $H_3BF_6$.

The composition of the catalyst can be varied considerably by varying the proportions of HF and $BF_3$ employed in its preparation. It is preferred that the major constituent of the catalyst be anhydrous HF and the preferred composition is a mixture of HF and $BF_3$ containing 1 to 20 per cent of anhydrous $BF_3$ by weight. However, other proportions may be employed, for example as low as 0.1 per cent $BF_3$ up to 50 per cent $BF_3$ by weight, the remainder being HF.

The reaction with alcohols and olefins is usually carried out under pressure, preferably under sufficient pressure to maintain a liquid phase present during the reaction. The pressure will generally fall within the range of 1 to 60 atmospheres. The temperature is usually within the range of —30 to 350° F., preferably about 20 to 200° F. The optimum temperature will depend primarily on the composition of the catalyst and the character of the olefin employed in the reaction.

In carrying out the process, molar ratios of alcohols to olefins of about 1:1 to 10:1 are usually employed with a substantial molar excess of alcohol preferred. The feed may consist of a pure olefin such as ethylene, propylene, butylene, or higher olefin with a pure alcohol such as methyl, ethyl, propyl, butyl or higher alcohol. Where the process is employed to make solvents in which chemical purity is not necessary, mixtures of different alcohols and olefins may be employed. Thus the olefin may consist of an unsaturated gas fraction from petroleum refining. For example, a mixture of propylene and butylenes with other saturated and unsaturated hydrocarbon gases occurring as a by-product in the cracking process may be employed with various individual alcohols or mixtures of alcohols. In addition to the gaseous olefins, I may also employ the liquid olefins such as the various amylenes, hexylenes, heptenes, octenes, etc. I may employ unsaturated olefin polymers such as the dimers, trimers and tetramers of propylene and butylene. I may also employ certain of the olefin derivatives such as chlorpropylene and methallyl chloride and the diolefines may also be used, e. g. butadiene, isoprene, chlorprene, cyclopentadiene, etc.

As examples of alcohols, my invention is not limited to the simple alcohols mentioned hereinabove but is applicable also to the polyalcohols such as the glycols, glycerol, erythritol, cellulose, etc. Ethylene glycol and butylene glycol are of special interest, particularly the 2,3-butylene glycol obtained from the fermentation of sugars. I also contemplate applying my process to the manufacture of polymers of high molecular weight from olefin alcohols such as allyl alcohol, producing chain-like molecules or polyethers.

My process may be conducted in either batch or continuous operation. In either operation the order of combining the reacting materials is of importance, and it is particularly important to avoid contact between the olefin and the catalyst in the absence of the alcohol ingredient in order to reduce formation of olefin hydrocarbon polymers. It is preferred to combine the alcohol with the catalyst and then introduce the olefin with efficient agitation. Where a gaseous olefin is used it may be forced in under pressure or it may be added to the reaction mixture at a low temperature in the form of a liquid and the temperature thereafter may be allowed to rise to the desired reaction temperature. If desired, the olefin and alcohol in solution may be added to the catalyst, preferably by gradually injecting the solution into the reaction mixture containing the catalyst at reaction temperature and with good agitation. When carrying out the process continously the same method of mixing may be used.

In recovering the ether product from the reaction mixture, it is usually necessary to reduce the pressure and allow the HF and BF₃ to be released either at the reaction temperature or at some higher temperature if necessary. The catalyst vapors may be recovered and recycled to the reaction chamber in a continuous process or to a new batch of alcohol and olefin in a batch operation. The remaining product after removal of the catalyst is distilled to separate the ether from the excess of alcohol and the alcohol may then be recycled to the reaction stage of the process for further treatment. If desired, the crude reaction product, after separation of the catalyst, may be washed with water and neutralized to remove any remaining catalyst, particularly in the case of the higher boiling ethers which require a higher temperature for distillation. The high boiling and the solid ether may also be recovered by means of a solvent.

As an example of my process, an autoclave was charged with a mixture of 368 parts by weight of absolute ethyl alcohol, 25 parts of BF₃, and 25 parts of HF. To this was then added 350 parts of propylene and the mixture was heated to 210° F. with agitation. The reaction was slow at this temperature but when the mixture was heated to 300° F., the velocity of the reaction increased markedly. At this temperature the pressure of the reaction mixture decreased from 730 to 350 pounds per square inch in about 3½ hours. In this experiment no attempt was made to recover the catalyst which was destroyed by the addition of water. The upper layer containing the ether product was separated, neutralized with aqueous sodium carbonate solution, dried and distilled. The fraction boiling at 50 to 54° C. was collected as ethyl isopropyl ether. The reaction may be expressed by the following equation:

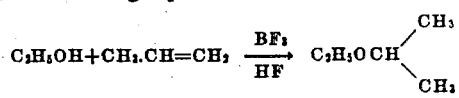

The reaction can be conducted in a shorter time by the use of a larger amount of catalyst, for example 20 to 40 per cent by weight of the alcohol treated.

In the case where a polyalcohol is etherified, for example ethylene glycol, I may etherify only one hydroxyl group by employing a large excess of the glycol, and subsequently I may, if desired, etherify the remaining hydroxyl group with a different alkyl radical by using a different olefin. Also when employing a mixture of alcohols or a mixture of olefins, I may obtain a certain selectivity by halting the reaction short of completion with respect to the mixed reaction ingredients employed. Thus in the case of a mixture of normal butylene and isobutylene, etherification, for example with ethyl alcohol, may be carried out to produce preferentially t-butyl-ethyl ether. In order to obtain a maximum utilization of catalyst in my process I prefer to maintain the conditions substantially anhydrous.

Having thus described my process what I claim is:

1. The process of producing ethers by interaction between olefins and alcohols which comprises contacting an olefin with an alcohol in the presence of a catalyst consisting essentially of hydrofluoric acid and boron fluoride.

2. The process of claim 1 wherein the amount of hydrofluoric acid in said catalyst predominates over the amount of boron fluoride.

3. The process of claim 1 wherein the proportion of boron fluoride to hydrofluoric acid in the catalyst is within the range of 1 to 20 per cent.

4. The process of producing ethers by interaction of an alcohol with an olefin which comprises mixing said alcohol with a catalyst comprised of HF and BF₃, agitating the resulting mixture and gradually introducing said olefin into the reaction mixture as rapidly as required for the etherification reaction while avoiding sufficient concentration of olefin to result in an undesirable olefin polymerization.

5. The process of preparing ethyl isopropyl ether which comprises interacting a mixture of ethyl alcohol and propylene with a catalyst comprised of hydrofluoric acid and boron trifluoride.

6. The process of preparing dibutyl ether which comprises interacting a mixture of butyl alcohol and butylene with a catalyst comprised of hydrofluoric acid and boron trifluoride.

7. The process of producing 2,3-butylene glycol diethyl ether which comprises interacting a mixture of 2,3-butylene glycol and ethylene with a catalyst comprised of hydrofluoric acid and boron trifluoride.

8. In the process of making ethers by interaction of alcohols and olefins in the presence of a catalyst, the improvement comprising employing as a catalyst hydrofluoric acid containing a minor amount of boron fluoride, maintaining the concentration of said alcohol in contact with said catalyst in molar excess of the concentration of olefin, and recovering the resulting ether from the reaction products.

9. The process of claim 8 wherein the molar ratio of alcohol to olefin is within the range of 1:1 to 10:1.

10. The process of claim 8 wherein the reaction is conducted at a temperature within the range of about −30 to 300° F.

11. The process of producing ethers by interaction of an alcohol with an olefin which comprises mixing said alcohol with a catalyst comprised of HF and BF₃, agitating the resulting mixture and gradually introducing said olefin into the reaction mixture as rapidly as required for the etherification reaction while avoiding sufficient concentration of olefin to result in an undesirable olefin polymerization, separating catalyst from the reaction products and recycling said catalyst to the reaction step of the process.

12. The process of claim 1 wherein the olefin is isobutylene.

ARTHUR P. LIEN.